May 9, 1933.  G. SIPP  1,908,192
BEAMING MECHANISM FOR WARPING AND BEAMING MACHINES
Filed Oct. 10, 1931  4 Sheets-Sheet 2
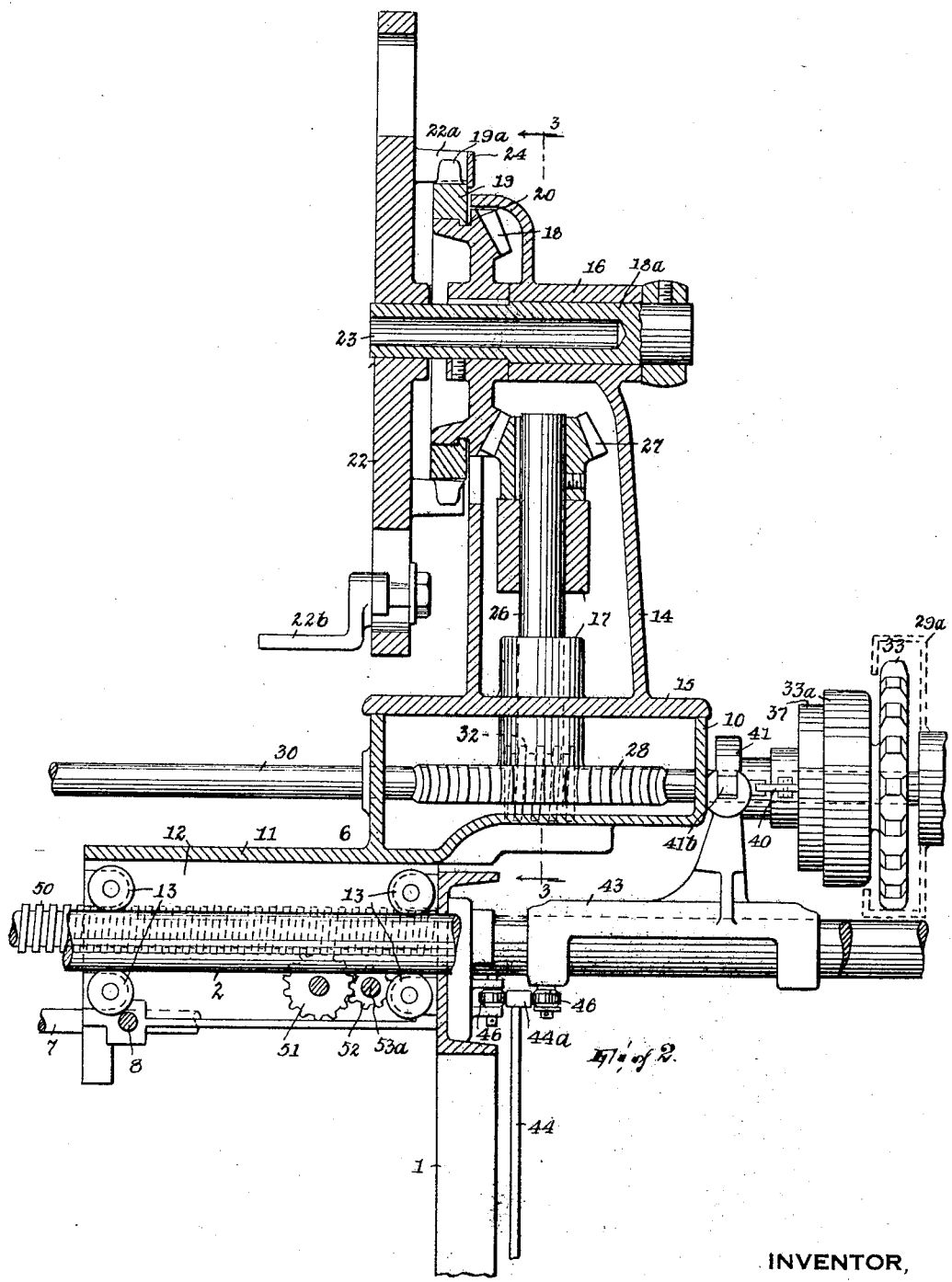
INVENTOR,
Grant Sipp,
BY HIS ATTORNEY

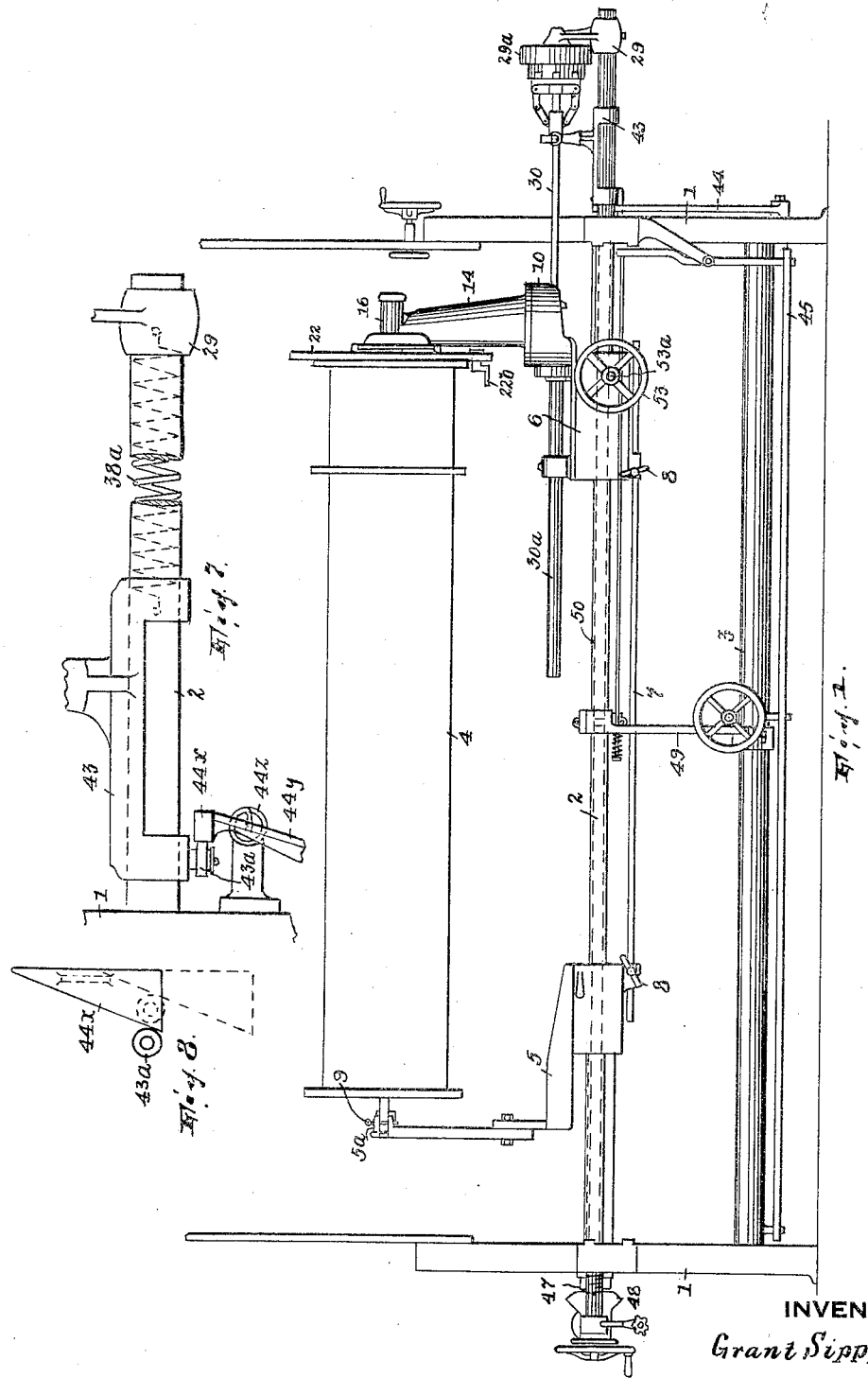

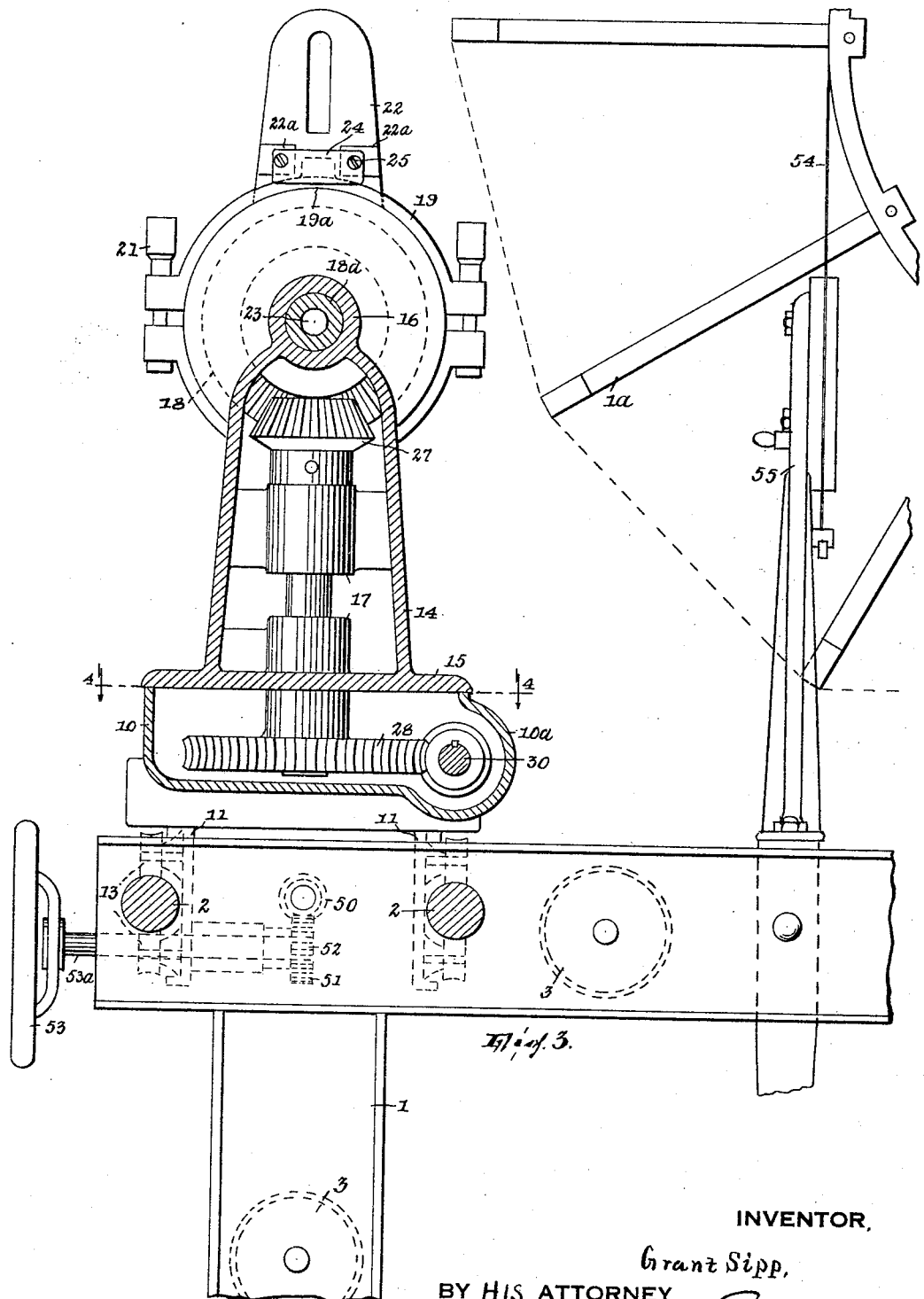

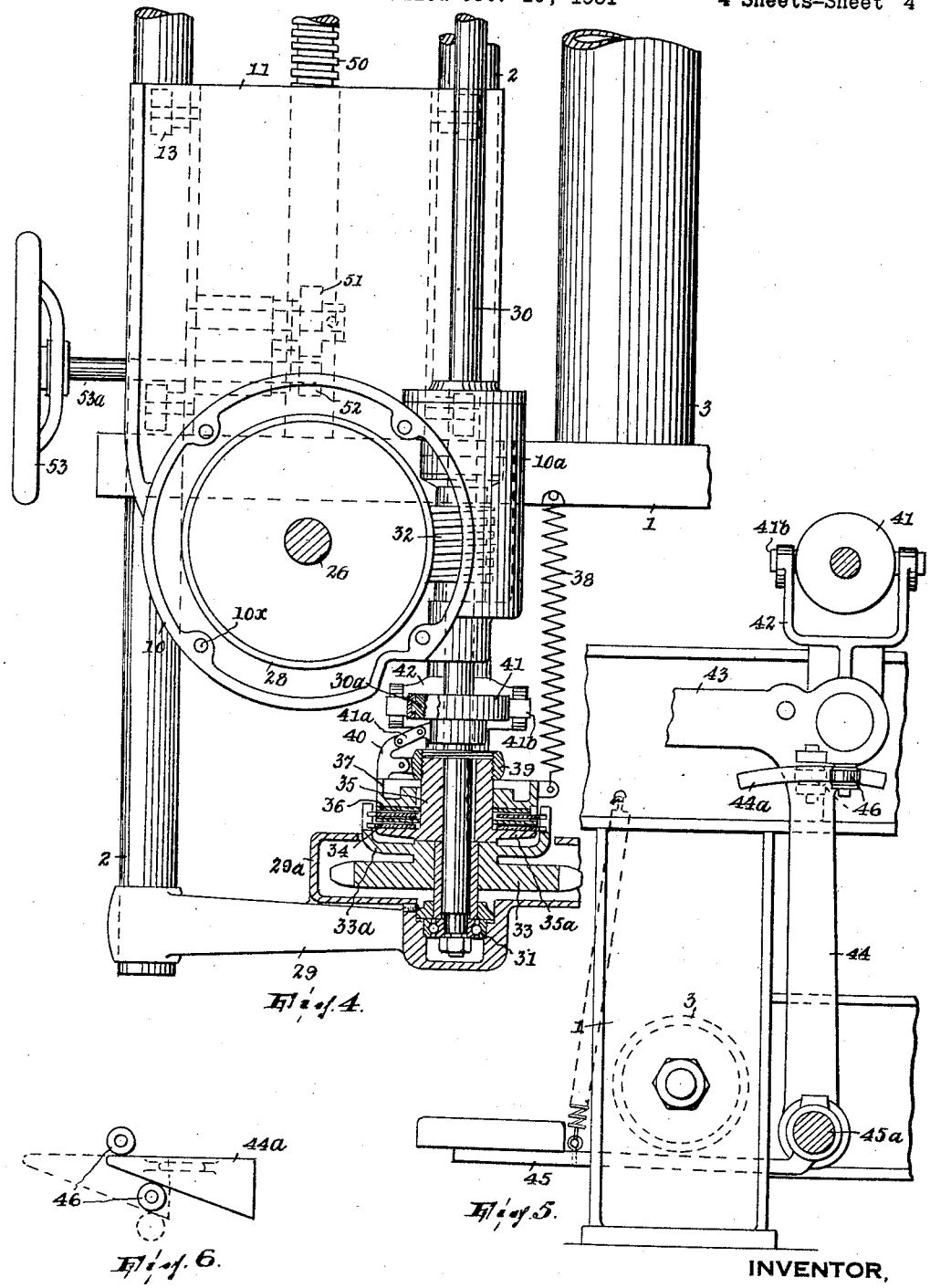

Patented May 9, 1933

1,908,192

UNITED STATES PATENT OFFICE

GRANT SIPP, OF PATERSON, NEW JERSEY, ASSIGNOR TO SIPP-EASTWOOD CORPORATION, OF PATERSON, NEW JERSEY, A CORPORATION OF NEW JERSEY

BEAMING MECHANISM FOR WARPING AND BEAMING MACHINES

Application filed October 10, 1931. Serial No. 568,109.

In machines for beaming warps the ideal condition is for the warp, between the beam and the friction-braked reel from which the warp is unwound, to be kept in a state of substantially constant tension even though the operation is stopped for any reason by cutting off the beam from its driving means. Heretofore, when the drive was cut off, as by shifting a belt from a fast to a loose pulley, re-rotation of the beam was sought to be prevented by a pawl which in the forward direction of the beam clicked idly over the teeth of a gear or the like fixed in some way to rotate with the beam: see, for instance, my Patent No. 1,719,565. This was a faulty expedient because the pawl did not usually immediately abut a tooth of the gear when the gear stopped its forward rotation (that is, the gear usually stopped with such tooth somewhat ahead of the pawl), wherefore re-rotation of the beam and consequently slackening of the warp took place. Wherefore it has been proposed to provide a beam-driving train in which there would be included an intermeshing worm and worm-wheel, whereby the worm due to the pitch of its thread would, on cutting off the drive, act directly to prevent re-rotation of the worm wheel and hence of the beam. But in these machines the beam is caused to traverse lengthwise of itself so as to wind the warp helically thereon and in order to utilize the worm and worm-wheel in the driving train the worm-wheel was splined to a shaft axially alined with the beam, which meant not only that useful space was encroached on by this shaft but, as an incident of the braked reel acting through the warp to resist rotation of the beam, a binding or cramping was set up between the inter-splined shaft and worm-wheel which was so severe that the traverse took place only in a quite intermittent fashion, even if the parts were kept well lubricated. According to this invention I also utilize the intermeshing worm (or equivalent threaded member, by which I herein mean one having its threads formed around its axis) and worm-wheel so as to have the advantage that the worm will directly check re-rotation of the worm-wheel and hence of the beam. But instead of splining the worm-wheel to a member which drives the beam I spline the other member or the worm to a shaft for driving the same and hence the worm-wheel and beam. In such an arrangement there is no appreciable torque exerted on the splined member (worm), and due to resistance of the reel, which acts appreciably to set up binding between it and the shaft which drives it, but instead such resistance acts (through the worm wheel) mainly to tend to displace the worm axially. Therefore the traverse occurs without binding, or in other words proceeds evenly or smoothly. Moreover, my construction makes it possible for the shaft which drives the worm to project inwardly and since there is no occasion for its shifting lengthwise with the beam as in the mentioned construction utilizing a worm and worm-wheel in the driving train it does not encroach on useful space.

My invention further contemplates a driven system comprising in itself driving and driven elements (the latter element having the beam suitably connected to rotate therewith) connected together by a friction clamp. Occasionally, the attendant has to wind the warp back onto the reel, having released its brake, and this may be done by releasing the clamp, whereupon said driven element may rotate backward independently of the driving element; and when the driven element is thereafter rotated forwardly again by hand until the warp has been re-tensioned (the reel brake being again set) the clamp is re-established so that said elements are again fixed together to rotate as one. Since the clamp is of the friction type it can be set so that on reeling back it will oppose resistance to re-rotation of the driven element and so preserve some tension on the warp at that time.

My invention further contemplates improved means for controlling the drive from the prime mover to the mentioned train.

In the drawings,

Fig. 1 is a front elevation of the end portion of a beaming machine involving the invention;

Fig. 2 is a vertical section in a plane substantially coincident with the beam axis, certain parts appearing in elevation;

Fig. 3 is a section on line 3—3, Fig. 2, certain parts appearing in elevation;

Fig. 4 is a horizontal section in the plane 4—4 of Fig. 3, with certain parts shown in section in a lower horizontal plane;

Fig. 5 is a fragmentary right-side elevation, showing the means for controlling the drive of the beam;

Fig. 6 is a plan of a detail appearing in Fig. 5; and

Figs. 7 and 8 illustrate a modification.

The frame of the machine comprises two sides 1, the usual pair of guide-bars 2, and a girt 3, such side-bars and girt connecting the sides.

The carriage for supporting the beam 4 is similar to the usual carriage in so far as it comprises two brackets, 5 and 6, which may slide on the guide-bars 2 and are connected by a tie-rod 7 having a sliding connection with each of them and adapted to be clamped therein by a hand-screw 8 so as to permit adjustment of the brackets apart or together according to the length of the beam to be supported. The bracket 5 has a socket bearing 5a in which one gudgeon of the beam is received and held by a removable pin 9, and in this and other respects it may be of known construction. The bracket 6 is of special and novel construction, as will appear in the following description:

An open-top circular housing 10 has an integral inwardly reaching square base 11 having parallel depending flanges 12 between the two guide-bars 2 and provided with top and bottom guide-rollers 13 which bear against the guide-bars as shown in Fig. 3 and confine the bracket 6 to rectilineal movement along the bars. Above this housing is another and upright housing 14 having an integral circular base 15 which forms a cover for housing 10 and which may be secured thereto by screws penetrating the base and tapped into holes 10x (Fig. 4) of housing 10, housing 14 having a top horizontal bearing 16 alined with bearing 5a and also vertical bearings 17.

The top bearing 16 receives the axial bearing portion or shaft 18a of a gear member 18 of the beveled type (parts 18 and 18a being keyed together as shown) which is embraced by an annular clamping member 19 having a circumferential tongue-and-groove connection 20 therewith as shown in Fig. 2 and comprising two sections which may be clamped fast to the gear member by tightening screws 21 connecting the sections (Fig. 3). On the inwardly projecting end of shaft 18a is revolubly mounted the cross-head or beam driving head 22; the near gudgeon of the beam 4 is received by a bore 23 of the shaft and the beam is lashed to the cross head to rotate therewith in the usual manner, to wit, by a chain or equivalent (not shown) wrapped around the head of the beam and adapted to have its ends attached to a lug 22b projecting from the cross-head. The driving head is made to rotate with its driving member 19 by their having interengaging lugs 19a and 22a and the driving head is kept from inward displacement with respect to said member by gibs 24 (only one being shown) overlapping the outer face of said member and removably attached to the driving head by screws 25. This construction permits the warp to be reeled back onto the reel 1a (Fig. 3) and consequently the beam to rotate backwardly independently of the means for driving the beam in the normal or forward direction and which, as will appear, includes the gear member 18—that is to say, by releasing the screws 21 to release member 19 from member 18; to preserve the tension on the warp at this time the clamp is loosened sufficiently so that it will slip on the member 18 subject to the necessary frictional resistance.

In bearings 17 is journaled a rotary transmission member consisting of a shaft 26 having affixed to its upper end a bevel pinion 27 meshing with gear 18 and at its lower end, within housing 10, a worm wheel 28.

Revoluble in the housing 10 and in a bearing bracket 29 which may be secured fast to the projecting end of one of the guide-bars 2 (Figs. 1 and 4) is a horizontal shaft 30, kept from endwise movement by its ball bearing 31 suitably held in the bracket. On this shaft is splined a worm 32 which meshes with worm-wheel 28 and is contained in a housing extension 10a of housing 10 and confined thereby to move along the shaft with the carriage (Fig. 4). (The shaft may telescope a housing-tube 30a therefor extending from housing 10 shown only in Fig. 1.) When this shaft is driven the beam 4 will be driven, as will be obvious; and such drive, because the worm is splined to shaft 30, may proceed regardless of the position of the beam carriage lengthwise of the guide-bars. The shaft 30 may obtain rotation from any prime mover, it here having loose thereon a sprocket wheel 33 to receive a suitably driven endless chain and which may be contained in a housing 29a (Fig. 4) forming part of the bracket 29 and adapted to be clutched with the shaft by means controlled by the attendant, as follows:

Sprocket wheel 33 has a cup-shaped portion 33a and forms with disks 34 contained in and held to revolve with the latter one member of a friction clutch of well-known type, the other member of which consists of a flanged sleeve 35 keyed to the shaft, and having disks 36 alternating with disks 34, and a pressure member 37 slidable on the sleeve toward its flange 35a to clamp the two sets of disks together, member 37 being normally retracted by a spring 38 connecting it with the frame; fixed on the inner end of the sleeve is a collar 39 affording fulcra for pressure-levers 40 which may bear against the member 37 when through links 41a a ring 41 revoluble on a collar 30a slidable on the shaft is forced outwardly. The collar 41 has pins 41b (Fig. 2) received by the notched ends of a fork 42 upstanding from a slide 43 movable along the guide bars 2. This slide, normally urged to the left or inward by spring 38, is adapted to be urged to the right (to close the clutch and hence drive the beam 4) by the wedge 44a at the upper end of a lever 44 which is fixed to the fulcrum shaft 45a, journaled in the frame sides, of the treadle 45, the wedge being interposed between rollers 46 on the near frame side and slide. An alternative construction is shown in Figs. 7 and 8. Here the slide is normally urged (to the right to close the clutch) by spring 38a, its movement under influence of the spring being normally opposed by the engagement of its roller 43a with the beveled head 44x of the lever 44y of the treadle, which is normally held back or in the position where the treadle abuts the girt 3 (see Fig. 5) by a more powerful spring 44z. When the treadle is depressed in this case the spring 38a closes the clutch. By this construction the closing pressure is determined by the known power of spring 38a, thus avoiding the "burning" of the clutch parts possible in the first construction, where the closing is effected by man power, and also making is possible to insure against sudden and powerful strain on the warp likely to be applied when man power is used.

When beaming is going on shaft 30, which projects inwardly and not outwardly of the frame, remains stationary so far as longitudinal movement is concerned, the carriage and all the parts carried thereby as well as the worm traversing relatively and parallel to it; said shaft therefore never encroaches on useful space, and no binding or intermittence of action characterizes the beaming with traverse because the splining is not with respect to the member of the worm-and-worm-wheel connection that it rotatively influenced by the resistance of the reel but is with respect to the other or worm member, to which such resistance is transmitted axially thereof.

Usually the carriage is traversed along the guide-bars 2 while the beaming is proceeding, for which purpose there is as usual a screw 47 journaled in the left side of the frame and driven in any way, as from the reel 1a, through means partly and only generally shown in Fig. 1 at 48, said screw having a threaded engagement with the bracket 5 of the carriage. The present invention is not concerned with the mechanism thus involved.

But for manually shifting the carriage along the guide-bars there is fixed in the right side of the frame and also in an intermediate bracket 49 upstanding from girt 3 a rack 50 (here in the form of a screw), and with this engages (Fig. 2) a pinion 51 with which meshes a pinion 52 on the shaft 53a of a hand-wheel 53, pinion 51 and said shaft being journaled in the flanges 12 of the housing 10. By interposing pinion 51 between pinion 52 and the rack, when the hand-wheel is turned in a given direction (as to the right) the carriage will move in the same direction.

The friction brake for the reel is, by way of example, the same as in my Patent No. 1,756,217, 54 being a brake strap embracing the concentric brake surface 1b of the reel and assumed to be held taut by suitable means at each end, as in said patent, one of which is here shown at 55.

Having thus fully described my invention what I claim is:

1. In combination, supporting means including a frame and a sliding structure thereon, a frictionally braked reel journaled in the frame and from which to unwind the warp, said structure being slidable substantially parallel with the reel axis, a rotary driven system for beaming and holding taut the part of the warp extending from the reel, said system being journaled in the supporting means and including a beam having its axis substantially parallel with the reel axis and a toothed input gear member, and a rotary driving system for the driven system including a shaft journaled in the frame substantially parallel with the reel axis and a threaded output member splined on said shaft and having its threading engaged with the teeth of the input member and approximately parallel with the axis of the latter, said structure when slid along the frame forming means to shift with itself said system and said output member.

2. In combination, a frame, a frictionally braked reel journaled therein and from which to unwind the warp, a carriage slidable on the frame substantially parallel with the reel axis, a driven rotary system for beaming and holding taut the part of the warp extending from the reel, said system being journaled in the carriage and including a beam having its axis substantially parallel with the reel axis and a toothed input gear member, and a rotary driving system for the driven system including a shaft journaled in the frame in substantially parallel relation to the reel axis and a threaded output member splined on said shaft and movable by and with the carriage when the latter is slid along the frame and having its threading engaged with the teeth of the input member and approximately parallel with the axis of the latter.

3. In combination, supporting means including a frame and a sliding structure thereon, a frictionally braked reel journaled in the frame and from which to unwind the warp, said structure being slidable substantially parallel with the reel axis, a rotary driven system for beaming and holding taut the part of the warp extending from the reel, said system being journaled in the supporting means and including, with a beam having its axis substantially parallel with the reel axis and a gear member fixed to rotate with the beam, a rotary transmission member having its axis angularly related to that of the beam and being geared with the gear member and having an input gear, and a rotary driving system for said driven system including a shaft journaled in the frame substantially parallel with the reel axis and a threaded output member splined on the shaft and having its threading engaged with the teeth of the input gear and approximately parallel with the axis of the transmission member, said structure when slid along the frame forming means to shift with itself said system and output member.

4. In combination, a frame, a frictionally braked reel journaled therein horizontally and from which to unwind the warp, a carriage having upstanding portions and slidable on the frame substantially parallel with the reel axis, a beam-including rotary structure journaled in said portions, a driving shaft revoluble in the frame substantially parallel with the reel axis and below the beam, a threaded output member splined on the shaft and slidable along the same by and with the carriage, and a rotary member journaled in the carriage with its axis upright and geared with said structure and having a toothed input member whose teeth are engaged with the threading of the output member.

5. In combination, a frame, a frictionally braked reel journaled therein horizontally and from which to unwind the warp, a carriage having upstanding portions and slidable on the frame substantially parallel with the reel axis, one of said portions forming a housing, a beam-including rotary structure journaled in said portions, a driving shaft revoluble in the frame substantially parallel with the reel axis and penetrating the housing, a threaded output member splined on the shaft and contained in the housing and slidable along the shaft by and with the carriage, and a rotary member journaled in the housing with its axis upright and geared with said structure and having a toothed input member whose teeth are engaged with the threading of the output member.

6. The combination of supporting structure affording a bearing for one end of a beam and rotary means to support the other end of the beam comprising rotary coaxial head and head-driving members one of which is substantially coaxial with said bearing and journaled in said structure and the other revolubly supported by the first member, said head member having means to engage and rotate the beam therewith, and a clamp connected with one member to rotate as a whole in unison therewith and circumferentially and releasably engaging the other member.

7. The combination of supporting structure affording a bearing for one end of a beam having a trunnion at its other end and rotary means to support the other end of the beam comprising rotary coaxial head and head-driving members one of which is substantially coaxial with said bearing and journaled in said structure and the other revolubly supported by the first member, said head member having means to engage and rotate the beam therewith and one of said members having axial means to receive said trunnion, and a clamp connected with one member to rotate as a whole in unison therewith and circumferentially and releasably engaging the other member.

8. The combination of supporting structure affording a bearing for one end of a beam and rotary means to support the other end of the beam comprising rotary coaxial head and head-driving members one of which is subantially coaxial with said bearing and journaled in said structure and the other revolubly supported by the first member, said head member having at the side thereof adjacent the bearing means to engage and rotate the beam therewith, and a clamp, arranged wholly at the other side of the head member, connected to rotate with said head member and releasably engaging the other member.

9. The combination of supporting structure affording a bearing for one end of a beam and rotary means to support the other end of the beam comprising rotary coaxial head and head-driving members the latter of which is substantially coaxial with said bearing and journaled in said structure and the other revolubly supported by and removable axially from the first member, and means to clamp said members together for rotation together, said members having releasable means to secure the removable member against axial displacement from the other member.

In testimony whereof I affix my signature.

GRANT SIPP.